May 9, 1933. F. N. WOODMAN 1,907,637
FLAT LINK CONVEYER BELT OF UNIT CONSTRUCTION
Filed Jan. 20, 1932
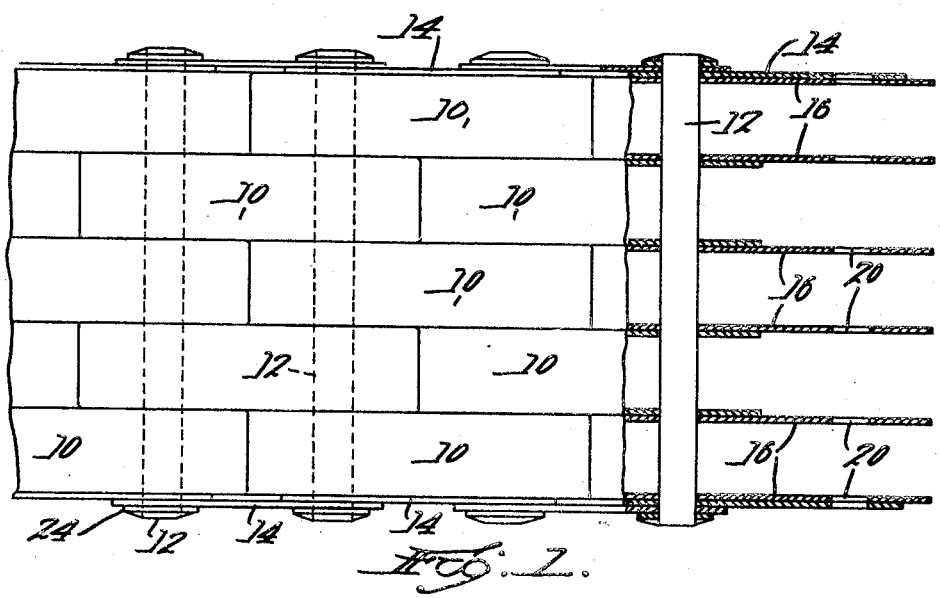
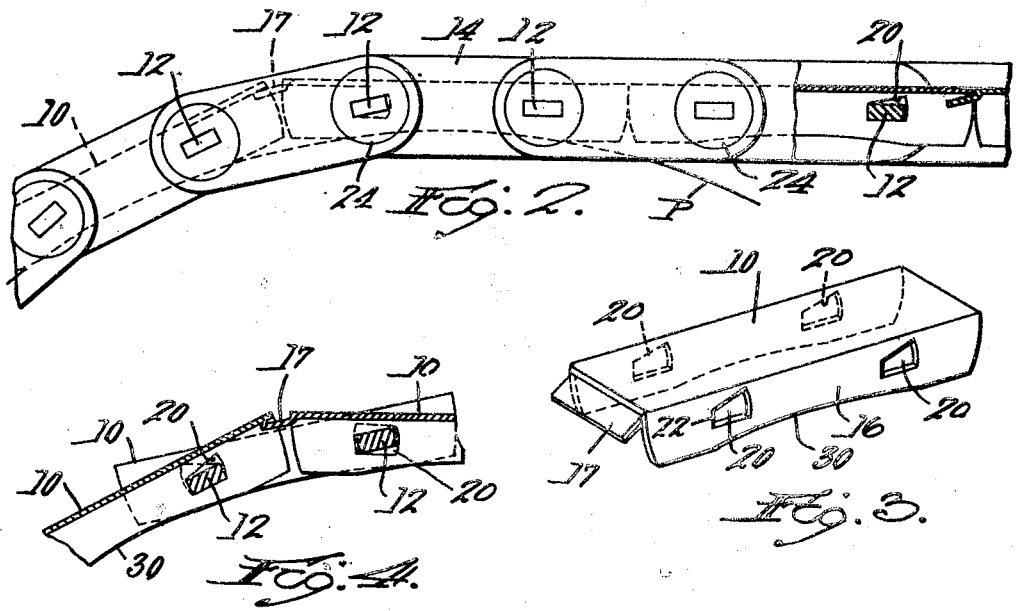
Inventor
Francis N. Woodman
By Attorneys Patented May 9, 1933

1,907,637

UNITED STATES PATENT OFFICE

FRANCIS N. WOODMAN, OF CLINTON, MASSACHUSETTS

FLAT LINK CONVEYER BELT OF UNIT CONSTRUCTION

Application filed January 20, 1932. Serial No. 587,786.

This invention relates to a conveyer belt formed of a plurality of flat links hinged together to provide a substantially continuous surface.

It is the object of my invention to provide a conveyer belt which may be built up from a plurality of unit links to provide a flat belt of any desired width.

A further object is to provide a belt which may be conveniently formed of sheet steel of a highly heat-resisting composition, and which will be substantially imperforate, so that fine material may be conveyed thereon.

I also provide a flat link conveyer belt having an improved and simplified hinge connection and rocking bearing.

My invention further relates to arrangements and combinations of parts which will be hereinafter described and more particularly pointed out in the appended claims.

A preferred form of the invention is shown in the drawing, in which

Fig. 1 is a plan view of a portion of my improved belt, partly in section;

Fig. 2 is a side elevation thereof;

Fig. 3 is a perspective view of one of the links, and

Fig. 4 is a detail view illustrating the flexing of the belt.

Referring to the drawing, my improved belt is formed from a plurality of body links 10 and cross bars 12, and may also be provided with side or guard links 14.

Each body link 10 is preferably formed from a single piece of sheet metal, as indicated in Fig. 3, bent to provide side flanges 16 and an offset end portion 17. Bearing openings 20 are provided in the side flanges 16, through which the cross bars 12 are inserted. The openings 20 preferably have straight transverse outer end faces 22 and preferably increase gradually in width toward the center of the link, thus giving each opening 20 a fan-shaped section.

When the parts are assembled, the sides of the link 10 are closely adjacent and the offset end portion 17 of each link projects under the open end portion of the next adjacent link, thus providing a substantially continuous supporting surface.

The cross bars 12 may be secured against endwise displacement in any convenient manner, as by providing washers 24 which may be held in place by welding at the ends of the cross bars.

A belt may be built up entirely from body links 10 and cross bars 12, or may be provided with side or guard links 14 which project to any desired extent above the surface of the belt and prevent lateral displacement of the material being transported thereon.

When the belt is running straight, as indicated at the right in Fig. 2, the straight edge faces of the rectangular cross bar 12 engage straight outer end surfaces of the openings 20 in the links 10 or 14.

When the belt is flexed, however, each cross bar 12 rocks about its upper edge corners with a knife-edge action, thus permitting each link of the belt to turn easily and uniformly about its cross bar when the belt runs about a guide pulley P or is otherwise flexed. This turning movement is substantially frictionless.

The lower edges of the flanges 16 are preferably concavely recessed as indicated at 30, so as to clear the surface when running over a pulley P.

I have thus provided a form of flat link conveyer belt particularly adapted for use as a moving hearth in a heat-treatment furnace or for other purposes where the belt is subjected to high temperature conditions. The rectangular cross section of the cross bars 12 substantially increases the strength of the cross bars against shearing in a horizontal direction, and my improved belt is thus substantially stronger than belts using the ordinary hinge-pins of circular cross section.

Having thus described my invention and the advantages thereof, I do not wish to be limited to the details herein disclosed, otherwise than as set forth in the claims, but what I claim is:—

1. A conveyer belt comprising a plurality of links arranged in overlapping transverse series and cross bars pivotally connecting said links, said links being formed of sheet metal and being U-shaped in cross section and each end of each side portion of each link having a bearing opening loosely receiving its connecting cross bar and engaging said cross bar at one side only of said opening, and said cross bars being non-circular in cross section and having rocking pivotal connection with said links.

2. A link conveyer belt comprising a plurality of links arranged in overlapping transverse series and cross bars pivotally connecting said links, each link having a flat load-supporting surface and having two parallel depending side flanges and each of said side flanges having a non-circular bearing opening at each end thereof through which a cross bar extends, said openings having straight outer end walls and said cross bars being non-circular in cross section and loosely mounted in said openings, and each cross bar having rocking engagement with the outer end walls of the bearing openings in both side flanges of adjacent links.

In testimony whereof I have hereunto affixed my signature.

FRANCIS N. WOODMAN.